United States Patent
Pinto et al.

(10) Patent No.: US 7,658,096 B2
(45) Date of Patent: Feb. 9, 2010

(54) HUMIDITY SENSING APPARATUS

(75) Inventors: Gino Amaro Pinto, Milford, MA (US);
Craig Robert Halloran, Oxford, MA (US); Been-Chyuan Lin, Boxborough, MA (US); Tiago Braz Anes, Framingham, MA (US)

(73) Assignee: Setra Systems, Inc., Boxborough, MA (US)

( * ) Notice: Subject to any disclaimer, the term of this patent is extended or adjusted under 35 U.S.C. 154(b) by 0 days.

(21) Appl. No.: 12/108,842

(22) Filed: Apr. 24, 2008

(65) Prior Publication Data

US 2009/0211357 A1  Aug. 27, 2009

Related U.S. Application Data

(60) Provisional application No. 61/031,927, filed on Feb. 27, 2008.

(51) Int. Cl.
*G01N 5/02* (2006.01)
(52) U.S. Cl. .......................................... 73/73; 73/29.05
(58) Field of Classification Search ................ 73/29.01, 73/19.05, 73, 74; 324/696
See application file for complete search history.

(56) References Cited

U.S. PATENT DOCUMENTS

| | | | | |
|---|---|---|---|---|
| 4,020,417 | A * | 4/1977 | Brehob et al. | 324/694 |
| 4,399,404 | A * | 8/1983 | Resh | 324/689 |
| 4,514,722 | A * | 4/1985 | Batcheler et al. | 340/604 |
| 4,770,040 | A | 9/1988 | Hooper et al. | |
| 5,189,902 | A | 3/1993 | Groeninger | |
| 5,232,152 | A | 8/1993 | Tsang | |
| 5,450,012 | A * | 9/1995 | Champagne et al. | 324/347 |

(Continued)

FOREIGN PATENT DOCUMENTS

DE    3911151 A1 * 10/1990

(Continued)

OTHER PUBLICATIONS

Humidity: 2% and 3% Humidity Transmitter & Optional Temperature Sensors Models KHR, KHD, KHO. 2002 Kele Catalog, pp. 309-310. www.kele.com.

(Continued)

*Primary Examiner*—John Fitzgerald
(74) *Attorney, Agent, or Firm*—David G. Maire; Beusse Wolter Sanks Mora & Maire, P.A.

(57) ABSTRACT

An apparatus (10) for sensing a condition, such as humidity, through an opening (20) in a surface (12) such as a duct or wall. A housing (14) includes an outer section (16) mounted on the surface and a probe section (18) extending into the duct or wall. A circuit board assembly (32) is mounted within the housing and includes a user interface section (34) within the housing outer section and a sensor section (36) rigidly connected to the user interface section and extending into the housing probe section. The sensor section may be integrated into the circuit board assembly by a rigid connector (42) allowing easy removal and field replacement of the sensor section. A sealing device (56) isolates the housing outer section from the air within the duct or wall. A flexible grounding connection (66) provides electrical grounding of the circuit board assembly and a degree of mechanical support.

24 Claims, 3 Drawing Sheets

U.S. PATENT DOCUMENTS

| | | | |
|---|---|---|---|
| 5,479,104 A * | 12/1995 | Cambell | 324/690 |
| 5,621,391 A * | 4/1997 | Elseth | 340/604 |
| 5,821,405 A * | 10/1998 | Dickey et al. | 73/53.01 |
| 5,922,939 A | 7/1999 | Cota | |
| 6,085,576 A * | 7/2000 | Sunshine et al. | 73/29.01 |
| 6,240,778 B1 * | 6/2001 | Hannan et al. | 73/304 C |
| 6,254,008 B1 * | 7/2001 | Erickson et al. | 236/44 A |
| 6,601,440 B1 * | 8/2003 | Chuang | 73/73 |
| 6,658,915 B2 * | 12/2003 | Sunshine et al. | 73/23.2 |
| 6,774,347 B2 | 8/2004 | Shon et al. | |
| 6,883,364 B2 * | 4/2005 | Sunshine et al. | 73/23.34 |
| 6,975,236 B2 * | 12/2005 | Staples | 340/602 |
| 7,231,815 B2 * | 6/2007 | Kanare | 73/73 |
| 2005/0127925 A1 * | 6/2005 | Staples | 324/694 |
| 2005/0178200 A1 | 8/2005 | Stauss et al. | |
| 2006/0006883 A1 | 1/2006 | Foote | |
| 2006/0042410 A1 | 3/2006 | Arar et al. | |
| 2006/0117833 A1 * | 6/2006 | Kanare | 73/29.02 |
| 2006/0191318 A1 * | 8/2006 | McBride et al. | 73/23.2 |
| 2006/0201247 A1 * | 9/2006 | Speldrich et al. | 73/335.06 |
| 2006/0272392 A1 * | 12/2006 | Kanare | 73/29.02 |
| 2008/0141797 A1 * | 6/2008 | Rodriguez et al. | 73/866.5 |

FOREIGN PATENT DOCUMENTS

| | | | |
|---|---|---|---|
| DE | 4427244 A1 * | 2/1996 | |
| JP | 01242948 A * | 9/1989 | |
| WO | WO 2004102187 A1 * | 11/2004 | |
| WO | WO 2006060016 A1 * | 6/2006 | |
| WO | WO 2007139533 A1 * | 12/2007 | |

OTHER PUBLICATIONS

Vaporstat 9002: Infrared Water Vapor/Absolute Humidity Transmitter. Measures Dewpoint and Grains/lb dry air (Mixing Ratio). Goleta, CA: Telaire, 1998-2002.

\* cited by examiner

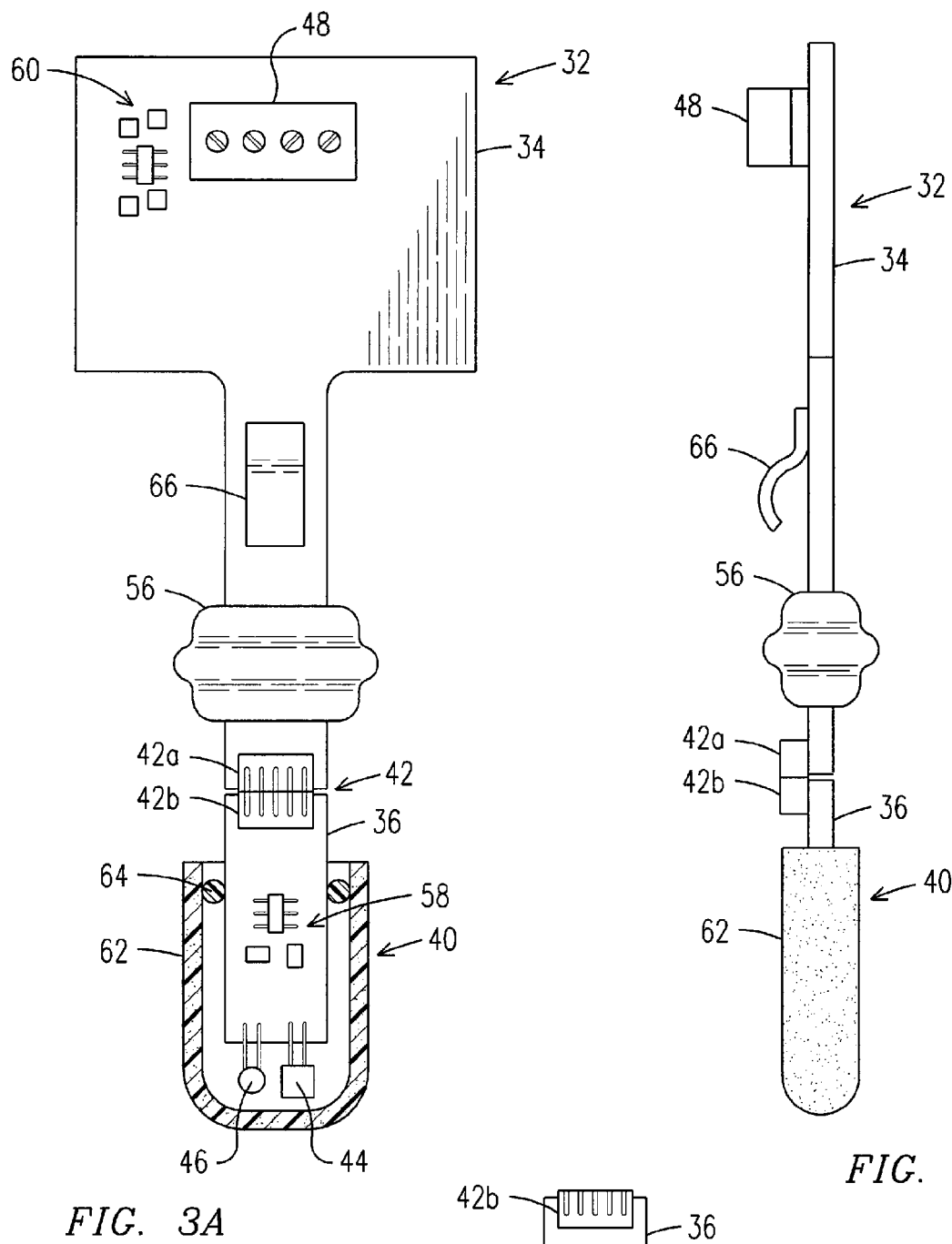
FIG. 3A
FIG. 4
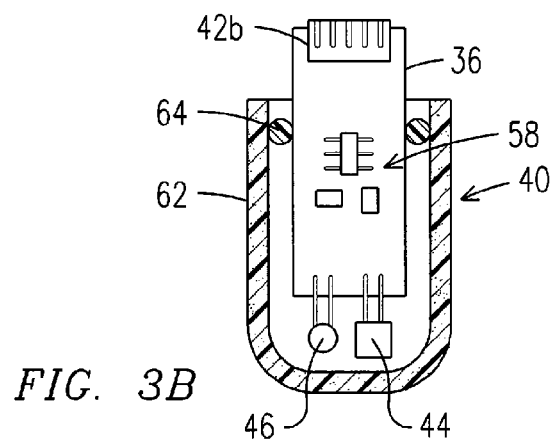
FIG. 3B

HUMIDITY SENSING APPARATUS

This application claims benefit of the 27 Feb. 2008 filing date of U.S. provisional patent Application No. 61/031,927.

FIELD OF THE INVENTION

This invention relates generally to the filed of electronic sensors, and more specifically to a sensor for detecting a condition through an opening in a surface such as a wall or duct, and in one embodiment specifically to a humidity sensor.

BACKGROUND

It is well known to utilize an electronic sensor to detect a condition through an opening in a surface, such as a wall or duct. U.S. Pat. No. 5,922,939 discloses a humidity sensor that can be mounted on an outside surface of a duct to detect a level of humidity within the duct. The humidity sensor includes a mounting enclosure attached to an outside of the duct, and a sleeve extending from the mounting enclosure and through an aperture formed in the duct. A sensing unit is mounted within the sleeve and is thereby positioned within the duct for sensing the level of humidity within the duct. The sleeve is releaseably attached to the mounting enclosure via a swage nut so that the sleeve and sensing unit can be removed from the duct for servicing without the need to remove the mounting enclosure. The sensing unit can then be removed from the sleeve for service or replacement with a like unit. The repaired or replaced sensing unit is then installed into the sleeve, and the sleeve is then repositioned into the duct and reattached to the mounting enclosure with the swage nut.

BRIEF DESCRIPTION OF THE DRAWINGS

The invention is explained in the following description in view of the drawings that show:

FIG. 3A is a front view of an alternative embodiment of a circuit board assembly that may be used with a humidity sensing apparatus such as shown in FIG. 1.

FIG. 3B is a front view of the sensor module of the circuit board assembly of FIG. 3A shown disconnected from a remainder of the assembly for replacement.

FIG. 4 is a side view of the circuit board assembly of FIG. 3A.

DETAILED DESCRIPTION OF THE INVENTION

Figure 1:
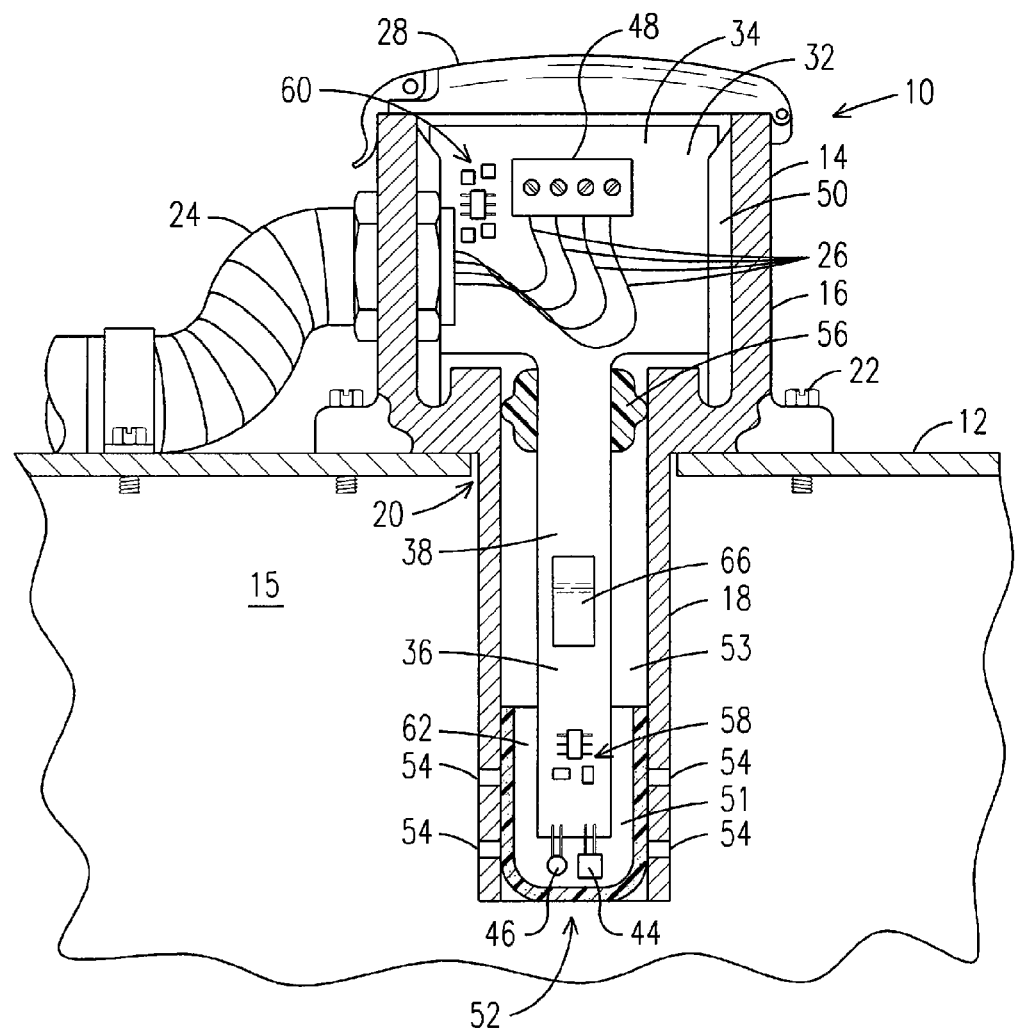
FIG. 1 is a front sectional view of a humidity sensing apparatus in accordance with one embodiment of the invention.
Figure 2:
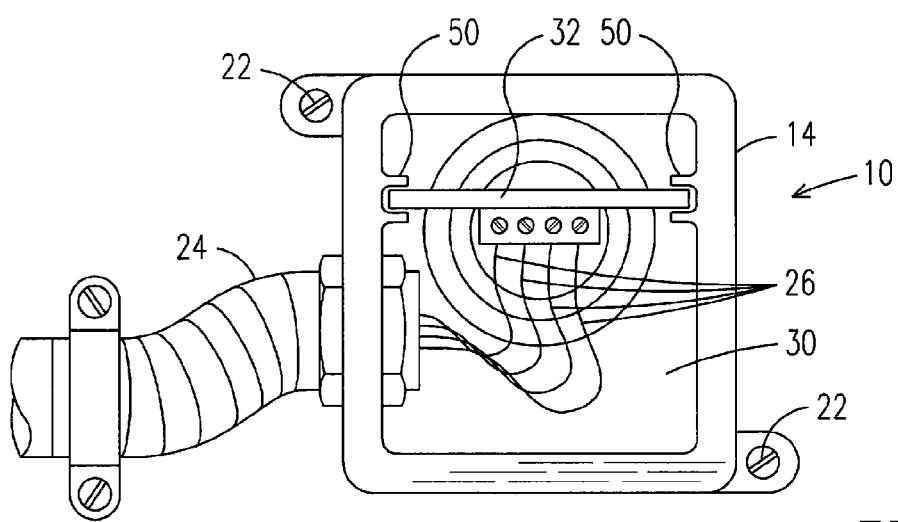
FIG. 2 is a top view of the humidity sensing apparatus of FIG. 1 with its housing cover removed.

FIGS. 1 and 2 illustrate an improved sensing apparatus for measuring a condition through a surface in accordance with one embodiment of the present invention. In particular, this embodiment is a humidity sensing apparatus 10 that is mounted to an accessible outside of a surface 12, such as a wall or duct, and functions to measure a level of humidity within an inside volume 15 defined by the surface 12. The apparatus 10 includes a housing 14 including an outer section 16 which remains on the accessible outside of the surface 12 and a probe section 18 which extends from the outer section 16 through an opening 20 formed in the surface 12. The housing 14 may be formed of any known material exhibiting material properties appropriate for the particular application, for example steel, aluminum or plastic. The outer section 16 and probe section 18 may be formed integrally or they may be separate pieces that are joined together, such as by welding, adhering, press-fitting or brazing for example. The housing 14 is attached to the surface 12 such as with screws 22 or other temporary or permanent means such as adhesive tape. Conduit 24 may be attached to the outer section 16 of housing 14 for directing electrical wiring 26 to the apparatus, such as may be used for conducting electrical power, control signals or output signals. A cover 28 may be provided to provide a loose or airtight or watertight seal against the housing outer section 16 for isolating the interior 30 of the housing from the external environment. The cover 28 may be hinged, tethered, or be otherwise moveably attached to the housing 14 to avoid its loss when opened, and it may be held against the housing in any known manner when closed, such as with a latch, clip, spring or screws.

The humidity sensing apparatus 10 also includes a circuit board assembly 32 that includes a user interface section 34 and a sensor section 36 extending from and rigidly connected to the user interface section 34. In the embodiment of FIG. 1, the user interface section 34 and the sensor section 36 of the circuit board assembly 32 are formed on a single circuit board substrate 38. The circuit board assembly 32 is adapted for installation in the housing 14 with the user interface section 34 disposed in the housing outer section 16 and the sensor section 36 extending into the housing probe section 18 for sensing humidity within the inside volume 15.

FIGS. 3A, 3B, 4 and 5 illustrate an alternative embodiment of the invention, with like components being numbered the same as in FIGS. 1 and 2, but where a distinction is that at least a portion of the sensor section of the circuit board assembly 32 is a removable and replaceable sensor module 40. The sensor module 40 is not formed on the same circuit board substrate as the user interface section 34 as in FIG. 1, but rather is separately formed and is attached to the remainder of the circuit board assembly 32 via a connector 42 having two selectively engageable pieces, such as piece 42a attached to the user interface section 34 and piece 42b attached to the sensor module 40. Connector 42 not only provides electrical connections between the two components but also provide a desired degree of mechanical rigidity so that the installation and removal of the circuit board assembly 32 may be accomplished in the same manner as is the integral single-substrate assembly 32 of FIG. 1. Examples of connectors commercially available from Samtec, Inc. include 42A Samtec PN SQT-104-01-F-D-RA and 42B Samtec PN MMT-104-02-S-MT. Other suitable connectors are available from Molex and AMP companies and others. The terms "rigid" and "rigidly connected" and "rigidly attachable" and the like are used herein not to require any specific degree of mechanical stiffness, but rather to indicate a degree of rigidity that is exhibited by a typical printed circuit board. These terms are used in contrast to a design where multiple circuit boards are interconnected only by wiring or by a plug-in wiring harness. The connector may be repeatedly releasable or it may be fixable and not releasable if desired to provide an additional degree of rigidity.

Figure 5:
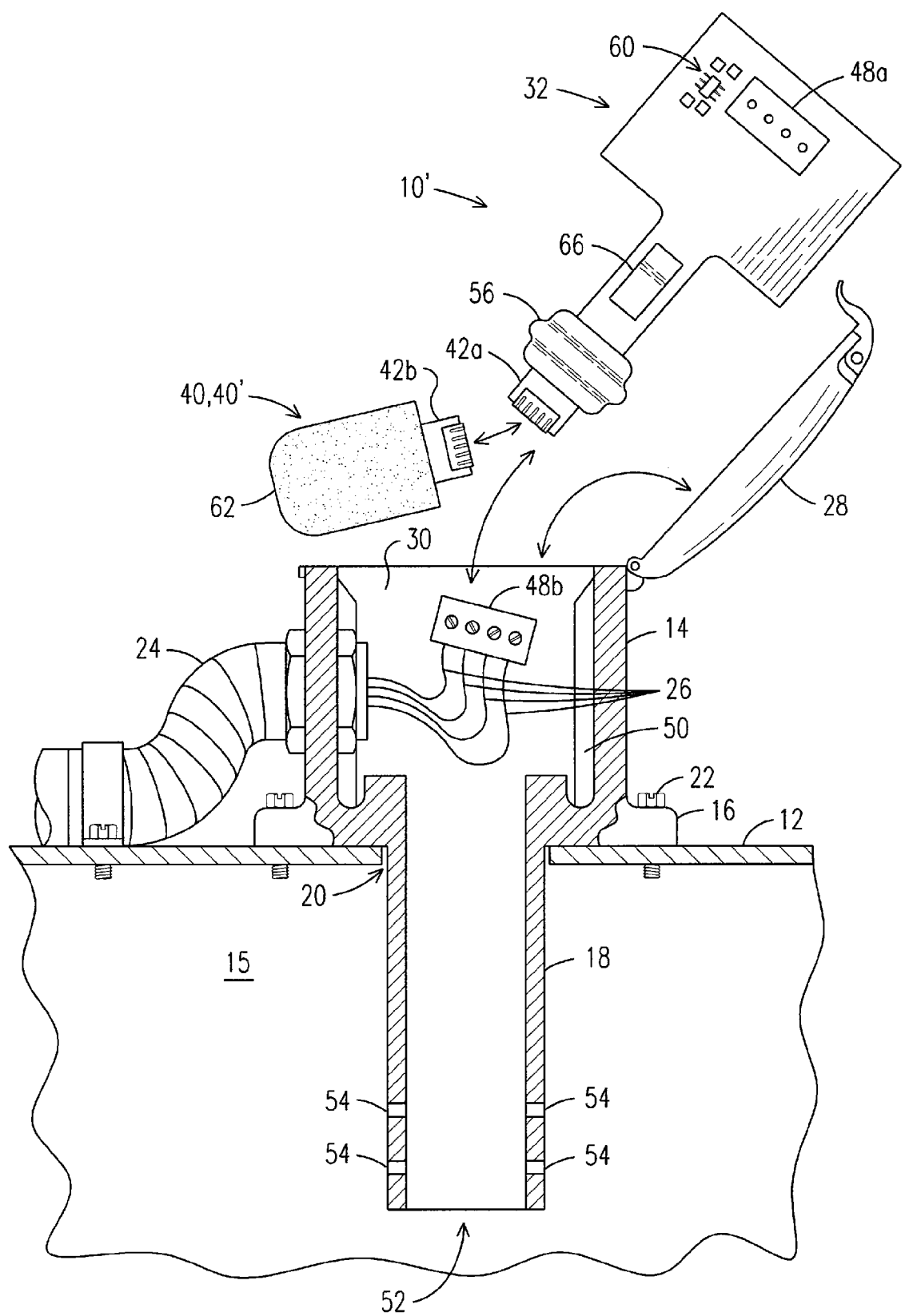
FIG. 5 is front sectional view of a humidity sensing apparatus in accordance with the invention showing its disassembly during servicing.

The advantage of a rigid circuit board assembly that includes both the user interface section 34 and sensor section 36 is most appreciated during field maintenance of the humidity sensor 10, such as is shown in FIG. 5 which illustrates a humidity sensing apparatus 10' being disassembled for servicing. Periodic servicing of such devices most often involves maintenance or calibration of the active sensing element, such as humidity sensor 44 or optional temperature sensor 46. Some prior art devices require the entire apparatus to be removed from the wall or duct surface in order to perform any service. Other prior art devices require the in-duct probe portion of the housing to be disconnected, such as the device of U.S. Pat. No. 5,922,939 described above. Yet still other prior art devices require the separate removal of a plurality of individual circuit boards and their associated wiring harnesses and connectors from within the housing. The present inventors have found that such prior art devices are often difficult to service because of the limited space provided within the apparatus housing, and further because access to the housing may be awkward or uncomfortable due to limited surrounding space or because the surrounding environment may be hot or cold, such as in an attic or crawlspace for home and commercial HVAC applications. Accordingly, the present inventors have innovatively provided a sensing apparatus wherein the functioning electronics can be easily removed in one piece from the housing without displacement of any portion of the housing from the mounting surface, and optionally, where further disassembly of the electronics package can be accomplished at a location remote from the mounting surface, such as outside of the attic or crawlspace. This is made possible by the circuit board assembly 32 of the present invention which includes a relatively large user interface section 34, which provides ample board space for electronics and also for user-manipulated devices such as connector 48, and which is either integral with or is attached to the relatively small and narrow probe section 36 that extends into the housing probe section 18 to penetrate the measured air space 15.

Referring again to FIG. 5, the cover 28 is opened to provide access to the interior 30 of the housing 14. A wiring connector 48 may be separated into its respective halves 48*a*, 48*b* to disconnect the circuit board assembly 32 from the associated external wiring 26. Examples of commercially available connectors include 48A ON Shore # EDSTL130/06, and 48B ON Shore # OSTTH060160. Other suitable pluggable connectors are also acceptable. Alternatively, the wiring connector may be fixed to circuit board assembly 32 with means for releasing field wiring, e.g., fixed circuit board mounted terminal connections. The entire circuit board assembly 32 may then be pulled out of the housing 14 as a single unit. Guides 50 may be formed integral to the housing 14 or attached thereto for guiding installation and removal of the circuit board assembly 32 to a desired position within the housing 14. In some embodiments, a fastener (not shown) may be used to hold the circuit board assembly 32 in a fixed position within the housing, while in other embodiments the cover 28 may be urged against the circuit board assembly 32 when closed to secure the assembly in place, and in yet other embodiments the guides 50 or seal bushing 56, may provide a degree of friction that is adequate to secure the circuit board assembly 32. The removed circuit board assembly 32 may then be serviced at a convenient location, such as remote from an attic or crawl space where the housing is located, and then reinstalled into the housing 14 by reversing the disassembly steps. Such service may include the replacement of an entire sensor module 40, for embodiments so equipped, by simply separating connector 42 and then installing a replacement sensor module 40'. Advantageously, a plurality of interchangeable and precalibrated humidity sensor modules 40, 40' may be provided so that any one of the humidity sensor modules 40, 40' may be alternatively, selectively, releasably and rigidly attached to become part of the circuit board assembly 32. This enables the replacement of one of the humidity sensor modules 40 with another of the humidity sensor modules 40' without the necessity for recalibration of the entire humidity sensing apparatus 10. Thus, the present invention simplifies and minimizes the in-housing steps necessary to remove the serviceable electronic portions of a through-surface condition sensor, and further simplifies and minimizes the effort necessary to accomplish a field repair of the components that are most likely to fail in such a sensor.

An innermost end 52 of the probe section 18 may be open and/or contain one or a plurality of vent openings 54 to allow for air communication between the inside volume 15 and the interior 51 of the filter element 62 so that the humidity sensor 44 and optional temperature sensor 46 are exposed to air of the interior 15 while still being somewhat mechanically protected within the probe section 18 of the housing 14. The sensor section of the circuit board may include one or more other sensors for detecting a concentration of any other gas or contaminant in the air of interest for a particular application, for example $CO_2$, CO or smoke particulates in certain embodiments. A sealing device 56 may be disposed between the circuit board assembly 32 and the housing 14 outward (toward the surface 12) from the opening 54 to isolate air in the interior 15, 53 from air 30 in the user interface section 34 of the housing 14. The sealing device 56 may be, for example, a bladder, boot, split bushing or gasket, etc. made of any suitable material such as rubber. The sealing device 56 also provides a degree of mechanical support for the circuit board assembly 32 within the housing 14.

The sensor section 36 of the circuit board assembly 32 may include not only the humidity sensor 44, which generates a sensor level signal (e.g. capacitive or resistive change) responsive to the level of humidity in the interior air 15, but also associated signal conditioning circuitry 58 for generating a standard calibrated high level signal (for example 0-2.5 volts) responsive to the sensor level signal. The high level signal may then be communicated to the user interface section 34 of the circuit board assembly 32 where there may be additional signal conditioning circuitry 60 for generating an alternate user desired output signal (for example 4-20 milliamp, 0-5V, 0-10V, etc.) responsive to the standard high level signal. An advantage of this arrangement is the ability to use a standard calibrated sensor module which can be packaged in several housing configurations (e.g., Duct-Mount, Wall-Mount, Outdoor Air, etc) and scaled for many user desired high level signal outputs. The user interface section circuitry 60 may include the capability for field-selectable output signal ranges or other user-selectable options. A filter element 62 may be removeably disposed over the humidity sensor 42 and other components of the sensor section 36 for additional protection from airborne or user handling contaminants as well as providing a degree of protection against electrical discharge damage to the sensors 44, 46 and electronics 58. The filter element 62 may be positioned over at least a portion of the sensor section 36 and it may be held in place by friction or a securing mechanism 64, e.g. elastic o-ring or other mechanism providing easy removal and replacement.

A flexible grounding connection 66 may be attached to the circuit board assembly 32 and in electrical contact with the electronic circuitry thereon. The flexible grounding connection 66 is mechanically biased against the probe section 18 when the circuit board assembly 32 is installed within the probe section 18 for providing electrical grounding and mechanical support between the probe section 18 and the circuit board assembly 32. The flexible grounding connection 66 may be formed of any suitable electrically conductive spring material, such as a thin piece of sheet steel or plated beryllium copper, for example. Such grounding of the circuit board assembly 32 to the probe section 18 has been found by the present inventors to provide a reduced susceptibility of the apparatus to ambient radio frequency energy and electrostatic discharge.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus for sensing a condition through a surface, the apparatus comprising:
a housing comprising an outer section and a probe section extending from the outer section, the housing outer section adapted for attachment to a surface with the probe section extending through an opening in the surface into an inside volume defined by the surface;
a circuit board assembly comprising a user interface section and a sensor section extending from the user interface section and rigidly connected thereto, the circuit board assembly adapted for installation within the housing with the user interface section disposed in the housing outer section and the sensor section extending into the housing probe section for sensing a condition in the inside volume; and
a connector for releasably establishing electrical connection to the circuit board assembly to enable operation of the circuit board assembly when installed within the housing and to enable removal of the circuit board assembly without displacement of the housing outer section or the housing probe section from the surface.

2. The apparatus of claim 1, further comprising the user interface section and the sensor section of the circuit board assembly comprising a single circuit board substrate.

3. The apparatus of claim 1, wherein the user interface section and the sensor section of the circuit board assembly are formed on respective separate circuit board substrates, and further comprising an additional connector releasably and rigidly attaching the separate circuit board substrates for installation within the housing.

4. The apparatus of claim 1, wherein the user interface section and the sensor section of the circuit board assembly are formed on respective separate circuit board substrates, and further comprising an additional connector fixedly and rigidly attaching the separate circuit board substrates for installation within the housing.

5. The apparatus of claim 1, further comprising a flexible grounding connection attached to the circuit board assembly and mechanically biased against the housing when the circuit board assembly is installed within the housing for providing electrical grounding and mechanical support between the housing and the circuit board assembly.

6. The apparatus of claim 1, wherein the sensor section of the circuit board assembly comprises a humidity sensor.

7. The apparatus of claim 1, wherein the sensor section of the circuit board assembly comprises at least one of a temperature sensor and a concentration sensor.

8. The apparatus of claim 1, further comprising:
a flexible grounding connection attached to the circuit board assembly and mechanically biased against the housing when the circuit board assembly is installed in the housing for providing electrical grounding and mechanical support between the housing and the circuit board assembly;
an opening formed in the probe section of the housing for air communication between the probe section of the housing and the inside volume;
a sealing device disposed between the circuit board assembly and the housing outward from the opening and effective to isolate inside volume air from the user interface section of the housing; and
a filter element removeably disposed over the humidity sensor within the probe section of the housing.

9. The apparatus of claim 1, further comprising:
an opening formed in the probe section of the housing for air communication between the probe section of the housing and the inside volume; and
a sealing device disposed between the circuit board assembly and the housing outward from the opening and effective to isolate inside volume air from the user interface section of the housing.

10. The apparatus of claim 9, further comprising a filter element removeably disposed over the humidity sensor within the probe section of the housing.

11. A humidity sensing apparatus comprising:
a housing comprising an outer section and a probe section extending from the outer section, the housing outer section adapted for attachment to a surface with the probe section extending through an opening in the surface into an inside volume defined by the surface;
a circuit board assembly comprising a user interface section installed in the housing outer section and a sensor section attached to the user interface section and extending into the housing probe section;
a connector for releasably establishing electrical connection to the circuit board assembly to enable operation of the circuit board assembly when installed within the housing and to enable removal of the circuit board assembly without displacement of the housing outer section or the housing probe section from the surface;
a plurality of interchangeable and pre-calibrated humidity sensor modules, each humidity sensor module being alternatively, selectively, releasably and rigidly attachable to comprise at least part of the circuit board assembly sensor section, with the selectively attached humidity sensor module extending into the housing probe section for sensing humidity within the inside volume, thereby enabling replacement of one of the humidity sensor modules with another of the humidity sensor modules without recalibration of the humidity sensing apparatus.

12. The apparatus of claim 11, further comprising a flexible grounding connection attached to the circuit board assembly and mechanically biased against the housing when the circuit board assembly is installed in the housing for providing electrical grounding and mechanical support between the housing and the circuit board assembly.

13. The apparatus of claim 11, further comprising a guide disposed within the housing for guiding installation of the circuit board assembly into a desired position within the housing.

14. The apparatus of claim 11, further comprising:
an opening formed in the probe section of the housing for air communication between the inside volume and the probe section of the housing; and
a sealing device disposed between the circuit board assembly and the housing outward from the opening and effective to isolate inside volume air from the user interface section of the housing.

15. The apparatus of claim 11, further comprising a filter element removeably disposed over the selectively attached humidity sensor module within the probe section of the housing.

16. The apparatus of claim 11, further comprising:
- a flexible grounding connection attached to the circuit board assembly and mechanically biased against the housing when the circuit board assembly is installed in the housing for providing electrical grounding and mechanical support between the housing and the circuit board assembly;
- an opening formed in the probe section of the housing for air communication between the probe section of the housing and the inside volume;
- a sealing device disposed between the circuit board assembly and the housing outward from the opening and effective to isolate inside volume air from the user interface section of the housing; and
- a filter element removeably disposed over the humidity sensor within the probe section of the housing.

17. The apparatus of claim 11, wherein each humidity sensor module further comprises at least one of a temperature sensor and a concentration sensor.

18. An apparatus for sensing humidity through a surface, the apparatus comprising:
- a housing adapted for attachment to a surface and comprising a probe section adapted to extend through an opening into an inside volume defined by the surface;
- a circuit board assembly disposed within the housing and comprising circuitry for generating a signal responsive to a sensed level of humidity within the inside volume;
- the circuit board assembly comprising a sensor section comprising a humidity sensor generating a sensor level signal responsive to the level of humidity and associated first signal conditioning circuitry generating a high level signal responsive to the sensor level signal;
- the circuit board assembly further comprising a user interface section rigidly attached to the sensor section and comprising second signal conditioning circuitry generating an output signal responsive to the high level signal;
- a guide positioning the circuit board assembly within the housing such that the sensor section extends into the probe section of the housing while the user interface section remains outside the probe section and allowing removal of the circuit board assembly from the housing without displacement of the probe section from the surface when a cover is removed from the housing.

19. The apparatus of claim 18, further comprising a connector rigidly joining the user interface and sensor sections of the circuit board assembly to enable selective replacement of the sensor section upon removal of the circuit board assembly from the housing.

20. The apparatus of claim 18, further comprising a flexible grounding connection attached to the circuit board assembly and mechanically biased against the housing when the circuit board assembly is installed in the housing for providing electrical grounding and mechanical support between the housing and the circuit board assembly.

21. The apparatus of claim 18, further comprising:
- an opening formed in the probe section of the housing for air communication between the probe section of the housing and the inside volume; and
- a sealing device disposed between the circuit board assembly and the housing outward from the opening and effective to isolate inside volume air from the user interface section of the housing.

22. The apparatus of claim 18, further comprising a filter element removeably disposed over the humidity sensor within the probe section of the housing.

23. The apparatus of claim 18, further comprising:
- a connector releasably and rigidly joining the user interface and sensor sections of the circuit board assembly together to enable selective replacement of the sensor section upon removal of the circuit board assembly from the housing;
- a flexible grounding connection attached to the circuit board assembly and mechanically biased against the housing when the circuit board assembly is installed in the housing for providing electrical grounding and mechanical support between the housing and the circuit board assembly;
- an opening formed in the probe section of the housing for air communication between the probe section of the housing and the inside volume;
- a sealing device disposed between the circuit board assembly and the housing outward from the opening and effective to isolate inside volume air from the user interface section of the housing; and
- a filter element removeably disposed over the humidity sensor within the probe section of the housing.

24. The apparatus of claim 18, wherein the sensor section further comprises at least one of a temperature sensor and a concentration sensor.

* * * * *